(12) United States Patent
Johns

(10) Patent No.: US 9,131,382 B1
(45) Date of Patent: Sep. 8, 2015

(54) TRUSTED USER INTERFACE FOR MOBILE WEB APPLICATIONS

(71) Applicant: Martin Johns, Karlsruhe (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/291,319

(22) Filed: May 30, 2014

(51) Int. Cl.
G06F 7/04 (2006.01)
H04W 12/10 (2009.01)

(52) U.S. Cl.
CPC .................................. H04W 12/10 (2013.01)

(58) Field of Classification Search
CPC .............................. H04W 12/10; H04W 12/06
USPC ............................................................. 726/4
See application file for complete search history.

(56) References Cited

U.S. PATENT DOCUMENTS

| 8,429,409 | B1 * | 4/2013 | Wall et al. ...................... 713/172 |
| 8,555,355 | B2 * | 10/2013 | Rathbun ........................... 726/5 |
| 8,694,784 | B1 | 4/2014 | Lekies et al. |
| 2010/0125737 | A1 * | 5/2010 | Kang ............................. 713/176 |
| 2011/0126010 | A1 * | 5/2011 | Kim et al. ...................... 713/168 |
| 2011/0185406 | A1 * | 7/2011 | Hirson et al. ..................... 726/6 |
| 2012/0144461 | A1 * | 6/2012 | Rathbun ........................... 726/5 |
| 2013/0318056 | A1 | 11/2013 | Lekies et al. |
| 2014/0041023 | A1 | 2/2014 | Lekies et al. |
| 2014/0101447 | A1 | 4/2014 | Lekies et al. |

OTHER PUBLICATIONS

U.S. Appl. No. 13/928,872, filed Jun. 27, 2013, Martin Johns.
U.S. Appl. No. 13/959,951, filed Aug. 6, 2013, Johns et al.

* cited by examiner

*Primary Examiner* — Teshome Hailu
(74) *Attorney, Agent, or Firm* — Fish & Richardson P.C.

(57) ABSTRACT

Implementations of the present disclosure include methods, systems, and computer-readable storage mediums for user confirmation of actions to be performed by a web application hosted on one or more servers. Actions can include receiving user input indicating a request directed to the web application, the user input being received through a mobile web browser, determining that the user input is requesting execution of an authorized action, and in response, providing data associated with the request for processing by a mobile authenticator application, providing a user interface generated by the mobile authenticator application based on the data, and receiving user confirmation of the authorized action through the user interface, and in response: providing a signed response by the mobile authenticator application, and transmitting the signed response to the one or more servers to initiate execution of the authorized action.

20 Claims, 4 Drawing Sheets

TRUSTED USER INTERFACE FOR MOBILE WEB APPLICATIONS

BACKGROUND

Over the past several years, mobile computing devices, such as smartphones and tablets, have become first class citizens in the world of computing. Advances in energy consumption, mobile processing power, and display quality have enabled mobile computing devices to handle common computing tasks as readily as more traditional computing devices, such as desktop and laptop computing devices. However, while the computational power of mobile computing devices can be comparable to desktop and/or laptop counterparts, other differences persist. Such differences include, for example, screen size, user interface (UI) paradigms, and limitations induced by mobile operating systems.

The above-identified differences, among others, can impact security characteristics of mobile computing devices. For example, reduced screen size can result in less space for visual security indicators that could help combat attacks, e.g., phishing attacks. As another example, UI paradigms of mobile computing devices allow for variants of attacks, e.g., clickjacking attacks. As another example, virtual keyboards on mobile computing devices can result in users choosing insecure passwords, e.g., as a result of necessary, uncomfortable context switches between letters, numbers, and special characters. As still another example, current restrictions in mobile operating systems and the lack of an extension model for mobile web browsers render attack mitigation tools ineffective or unusable in the mobile context.

SUMMARY

Implementations of the present disclosure include computer-implemented methods for user confirmation of actions to be performed by a web application hosted on one or more servers, the methods being performed by one or more processors. In some implementations, methods include actions of receiving user input indicating a request directed to the web application, the user input being received through a mobile web browser, determining that the user input is requesting execution of an authorized action, and in response, providing data associated with the request for processing by a mobile authenticator application, providing a user interface generated by the mobile authenticator application based on the data, and receiving user confirmation of the authorized action through the user interface, and in response: providing a signed response by the mobile authenticator application, and transmitting the signed response to the one or more servers to initiate execution of the authorized action.

These and other implementations can each optionally include one or more of the following features: the mobile authenticator application provides the signed response based on a shared secret; the mobile authenticator application provides the signed response to the mobile web browser, and the mobile web browser transmits the signed response to the one or more servers; the user interface displays a description of the authorized action; actions further include: providing an action identifier associated with the authorized action to the mobile authenticator application, and retrieving, by the mobile authenticator application, the description from a repository of authorized actions based on the action identifier; an authentication broker determines that the user input is requesting execution of an authorized action, and provides data associated with the request for processing by the mobile authenticator application; actions further include, prior to receiving user input indicating a request directed to the web application, providing a shared secret between the mobile authenticator application and the web application; and the shared secret is provided based on credentials of the user with the web application.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to an authorization delegation scheme for authenticating authorized actions. More particularly, implementations of the present disclosure enable user authentication of authorized actions to be performed by a server-side application, e.g., a "web application," using a native application, hereinafter referred to as the "mobile authenticator application," which functions as a companion application to a mobile web browser. For example, and as described in further detail herein, the web browser application and the mobile authenticator application are provided as client-side applications that are installed on and executed by a client-side computing device, e.g., a smartphone, a tablet, that operates using a mobile operating system. In accordance with implementations of the present disclosure mobile authenticator application serves as a trust anchor for the client-side by providing absent, trusted user interface (UI) capabilities.

Figure 1:
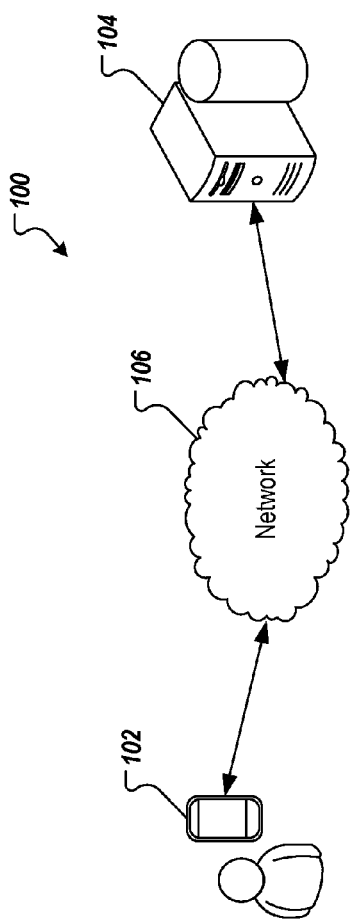
FIG. 1 depicts an example system architecture in accordance with implementations of the present disclosure.

FIG. 1 depicts an example system architecture 100 in accordance with implementations of the present disclosure. The example system architecture 100 includes a client-side, mobile computing device (a client) 102, a server-side computing device (a server) 104 and a network 106. In general, the mobile computing device 102 can include any appropriate type of computing device that operates using a mobile operating system. Example mobile operating systems can include Android, provided by Google, Inc., and iOS provided by Apple, Inc. Example mobile computing devices can include a handheld computer, a tablet computing device, a personal digital assistant (PDA), a cellular telephone, a network appliance, a camera, a smartphone, an enhanced general packet radio service (EGPRS) mobile phone, a media player, a navigation device, an email device, or any appropriate combination of any two or more of these data processing devices or other data processing devices. In the example system architecture 100 of FIG. 1, the mobile computing device 102 is depicted as a smartphone or tablet computing device.

The mobile computing device 102 can communicate with the server 104 over the network 106. The network 106 can include a large computer network, such as a local area network (LAN), a wide area network (WAN), the Internet, a cellular network, or a combination thereof connecting any number of mobile computing devices, fixed computing devices and server systems. The server 104 can include one or more computing devices and one or more machine-readable repositories, or databases.

For purposes of illustration, and as discussed in further detail below, a user can use the mobile computing device 102 to interact with a web-based mobile application (mobile web application) hosted by the server 104. In some examples, the mobile web application can be provided using one or more web pages of a web site that is hosted by the server 104. In some examples, interaction between the mobile computing device 102 and the server 104 includes executing a web browser on the mobile computing device 102 to display the one or more web pages. In some examples, the one or more web pages include interaction elements such as dialogue boxes and clickable buttons that enable the user to provide input to the web page. In some examples, and as discussed in further detail herein, the user is required to provide user credentials before being able to access certain functionality of the mobile web application. This process can be referred to as web authentication.

Implementations of the present disclosure will be described in view of the following general discussion of security threats, or attacks that web applications are susceptible to. Over the last decade, numerous security problems in the field of web applications have been discovered and documented. Example security problems result from attacks such as phishing, cross-site scripting (XSS), cross-site request forgery (CSRF), session fixation, and clickjacking Mobile web applications are susceptible to the same class of threats as their desktop/laptop counterparts. It has been shown, however, that several attack types, such as phishing and clickjacking, are harder to solve in the mobile scenario, due to their direct interplay with the available screen size, and/or mobile web browser limitations. Example attacks types are described in further detail below, and security aspects in the mobile scenario are also discussed.

The term phishing subsumes attacks that aim to obtain user credentials, e.g., username and/or password. More particularly, phishing attacks try to trick the user into interacting with a web resource that claims to be a legitimate part of a targeted web application, but is instead under the control of an attacker. Pharming is a subclass of phishing and relies on domain name system (DNS) spoofing. In the mobile context, it has been shown that mobile web applications expose a higher level of susceptibility to such attacks as a result of, for example, reduced availability of optical indicators, e.g., web browser indicators, secure sockets layer (SSL) indicators.

Clickjacking attacks exploit the fact that the users perception may vary from the web page rendering outcome by the web browser. In a clickjacking attack, the victim is a user that has an account with the target web application. To perform an attack, the attacker prepares a web page that causes the user to unwittingly perform actions on the target web application. The prepared page either loads the target web page into a transparent iframe and places the iframe logically in front of the next item the user will probably click, e.g., in the target web page, or the target page is covered by the iframe in a way that only a single interaction element, e.g., button, is visible, which the user does not perceive as being part of the target web page. It has been shown that traditional methods for protecting against clickjacking attacks, e.g., use of an X-Frame hypertext transfer protocol (HTTP) header, or frame-busting JavaScript code, are not sufficient for protecting non-iframe based collaboration interfaces, e.g., web widgets.

In the mobile context, techniques are provided, in which the specific characteristics of mobile web browsers are exploited to strengthen clickjacking attacks. For example, the term tapjacking has been coined for clickjacking attacks in the mobile context, because users do not click, and instead tap on their mobile devices in the mobile context. An example attack trajectory takes advantage of zooming elements of the target web page, where the hosting page, i.e., attacking page, can set a zoom factor that overrides the iframe's own scaling. In this manner, an attacker can include a transparent interaction element, e.g., button, for example, that fits the entire width of the screen. The combination of the increased attack surface on mobile computing devices, and users of particular mobile web applications being favorable targets lead to privacy and security threats.

A CSRF attacker can perform actions on behalf of the victim without ever getting any knowledge of the credentials. For example, the attacker inserts a crafted link into a website that causes the web browser to send a request to the target web application. For example, the attacker might put the example uniform resource locator (URL) https://www.bank.com/transfer.php?from=you&to=me into an image (<img>) tag on any website. Upon visiting the website, the user's web browser tries to retrieve a picture and sends the crafted request to the, in this example, banking website. The CSRF attack can be successful, if the victim is currently logged into their account through the website. For example, the web browser will attach a session identifier (SID) cookie to the request and initiate a money transfer, for example. For CSRF attacks, the mobile context is similar to the desktop/laptop context with a slight exception: client-side protection approaches, such as the CsFire extension, do not work, because many mobile web browsers have no extension support.

The term XSS denotes a broad class of attacks, in which the attacker is able to inject malicious script code into benign web pages. The script code often includes JavaScript, which can run in the web browser with all rights of the benign web page. An attacker can steal stored SIDs, catch or redirect user input, modify the appearance of the web page, and/or interact with the web application in the user's name.

A session fixation attack allows the attacker to set the SID before the user logs into the web application. The attack is successful, if the SID is not changed by the web application during the login procedure, and the attacker's window of opportunity lasts until the user logs out. For session fixation attacks, the mobile context is similar to the desktop/laptop context. However, sessions in some mobile web applications expire later, or do not expire at all and only delete the client-side session cookie upon logout. This extends the attacker's window of opportunity for control over the user's account.

In view of attack vectors, such as the example attack vectors described above, mitigation techniques have been developed. However, and as described in further detail herein, traditional mitigation techniques may be insufficient in the context of mobile web applications.

Client-side SSL authentication is an example authentication method that can be used to mitigate attacks. The current generation of mobile operating systems, however, is missing proper tools support for certificate management, which is needed for client-side SSL authentication. Furthermore, the usage of client-side SSL authentication only solves a subset of the identified security implications, i.e., all issues that exist in connection with the potential stealing of passwords (phishing). However, security problems that concern attacker-initiated state changes, e.g. caused by XSS, CSRF and/or clickjacking, remain unprotected.

Web browser extensions or plugins provide a potential approach to overcome security shortcomings of web applications. For example, security mechanisms are directly included in the web browser using a browser extension and/or to using rich internet application (RIA) plugins. In such cases, the security mechanism is implemented within a plugin-based applet. However, and as noted above, current mobile web browsers do not support extensions or plugins.

Dedicated, modified web browsers can be used to mitigate some attack vectors. For example, it is possible to deploy dedicated web browsers to mobile computing devices, which incorporate enhanced security mechanisms. However, the dedicated web browsers cannot be used within applications that offer an integrated web view, nor can they be set to serve as the default browser in certain mobile operating systems. Consequently, it may be an option for isolated web applications to require users to utilize a special web browser to access the web application. However, for all composite scenarios, in which more than one web application is involved in user interactions, e.g., mashups, widgets, or social sharing features, this mitigation model is infeasible. Also, work flows, in which external applications push information into a web application, e.g., using an http(s) URL cannot work in this scenario. Further, developing and maintaining a special web browser variant entails high effort and cost.

Local, network-layer helpers, such as HTTP proxies, can be used to mitigate some attack vectors. Such tools, however, cannot be deployed to the current generation of mobile computing devices.

In general, a web application can be described as a reactive system. For example, the web server that host the web application receives incoming HTTP requests and reacts based on the logic, e.g., business logic, programmed into the web application. In some cases, a subset of the incoming requests lead to changes in the server-side state, while others only retrieve data stored on the server. If received as part of an authenticated session, incoming request that lead to state changes represent security sensitive actions on the application data. Consequently, the handling of such requests requires special attention. Such requests can be referred to as authorized actions. In some examples, an authorized action is a security sensitive event on the server that is triggered by an incoming authenticated request. This means that the user authorized the web application to perform the requested action on behalf of the user. Determining which events are to be considered security sensitive can depend on the internal logic of the web application. Consequently, the applicable set of authorized actions is determined on a per-application basis. Example authorized actions include login into the web application, changes to the user's data record, ordering and purchasing of services and/or goods.

In some examples, for all authorized actions, the underlying assumption is that the owner of the credential, e.g., password, authenticated SID, is the originator of the triggering event. It is also assumed that the details of the action have not been tampered with by unauthorized third parties. In each of the above-discussed security issues, the web server cannot distinguish authorized actions, which have been conducted intentionally by the user, from authorized actions, that have either been conducted directly by the attacker, e.g., through credentials that have been stolen using phishing or XSS, or have been initiated by the attacker by tricking the user, e.g., through clickjacking or CSRF. Accordingly, web applications are missing a trusted path between the user and the back-end system (the web server). The back-end system needs reliable evidence, that the initiated security sensitive actions have indeed been deliberately conducted by the user. In some examples, a web application provides a trusted path, if all incoming requests for authorized actions can be verified on the server-side that they are generated with the user's explicit consent and that their integrity is ensured.

In view of the foregoing discussion, implementations of the present disclosure enhance web application security for mobile computing devices using a dedicated mobile application, the mobile authenticator application introduced above. In some examples, functionality provided by the mobile authenticator application proves to the server-side that incoming requests for authorized actions have been explicitly consented to by the user, and are thus, are fully intended by the user instead of being created without his consent, e.g., through clickjacking or XSS, and that the incoming requests for authorized actions have not been tampered with. In this manner, security problems of web applications, e.g., the example security problems discussed above, can be mitigated. Implementations of the present disclosure robustly separate security functionality from the browser-based front-end of the web application. Consequently, the mobile-specific weaknesses and limitations are no longer applicable. In some implementations, the web application can be provided as a cross-platform web application, which can be accessed on any web enabled mobile computing device. That is, the web application need not be specific to a particular operating system of a mobile computing device. In some examples, the mobile authenticator application is a native application for each mobile platform. That is, the mobile authenticator application is specific to the operating system of the mobile computing device that it is executing on. The mobile authenticator application, however, provides security functionality that is generic to various web applications. Consequently, the mobile authenticator application provides a trusted interface for more than one web application.

Figure 2:
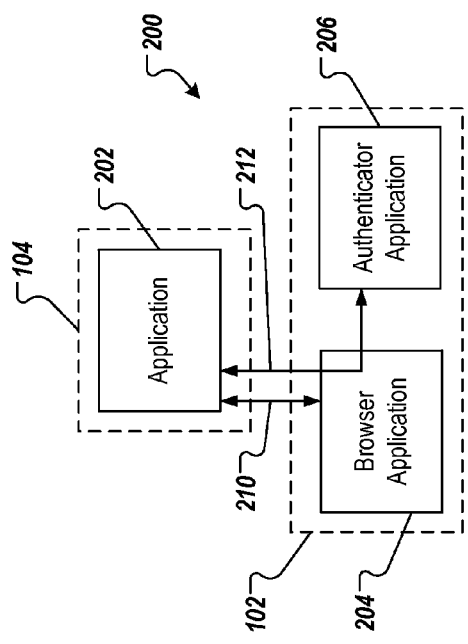
FIG. 2 depicts an example authentication scheme in accordance with implementations of the present disclosure

FIG. 2 depicts an example authentication scheme 200 in accordance with implementations of the present disclosure. In the depicted example, a user interacts with a web application 202 using a browser application 204. For example, the web application 202 can be hosted on a web server, such as the server 104 of FIG. 1, and the browser application can be installed on and executed by a computing device, such as the mobile computing device 102 of FIG. 1. In accordance with implementations of the present disclosure, a mobile authenticator application 206 is installed on and executed by the mobile computing device 206. In some implementations, and as described in further detail herein, general interactions 210, such as requests that are not directed to authorized actions, can be handled between the web application 202 and the browser application 204. In accordance with implementations of the present disclosure, security-sensitive interactions 212, such as requests that are directed to authorized actions, are handled between the web application 202, the browser application 204 and the mobile authenticator application 206. As described in further detail herein, the mobile authenticator application 206 serves as a trust anchor for the user in communicating with the web application 202, and establishes a trusted path between the UI provided in the browser application 204 and the web application 202.

In some implementations, the mobile authenticator application is a dedicated application that encapsulates the user's credentials and authorization state, and that maintains a trust relationship with the web server. In accordance with the present disclosure, authorized actions are routed through the mobile authenticator application on behalf of the web application. In some examples, the web browser never receives, processes, or sends credentials that can be utilized for conducting authorized actions with the web application. In this manner, the mobile authenticator applications serves as both a trusted UI for the mobile web interface, as well as a second authentication factor, effectively elevating all supporting web applications to using an implicit two-factor authentication scheme.

For general interactions, i.e., interactions that are not directed to authorized actions, the interaction between the web application and the web server is conducted without use of the mobile authenticator application.

For security-sensitive interactions, i.e., interactions that request execution of authorized actions, the control flow is routed using the mobile authenticator application. More specifically, and as described in further detail herein, a challenge/response protocol is provided to capture the user intent using a dedicated interaction bridge between the web browser and the mobile authentication application.

Figure 3:
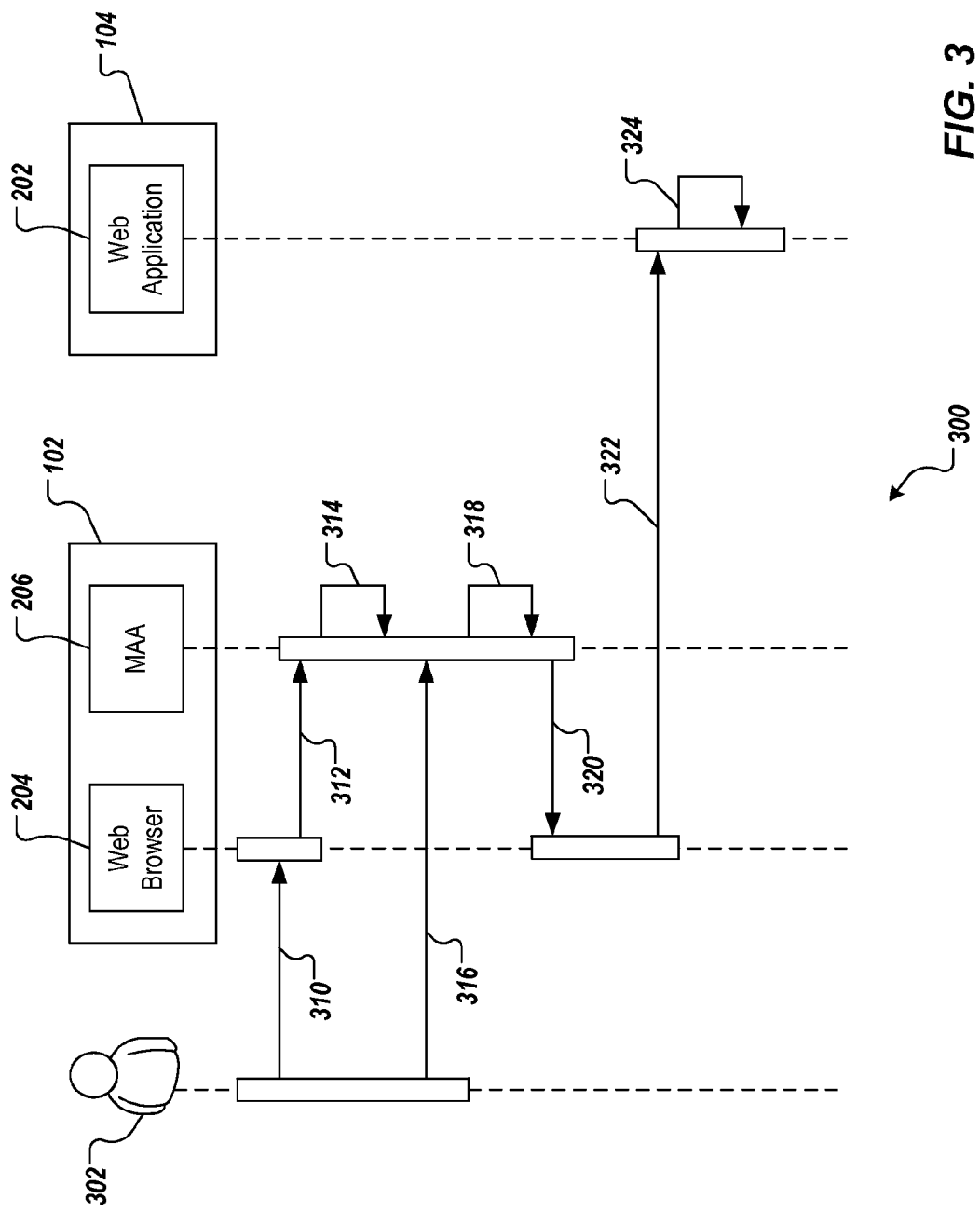
FIG. 3 depicts an example protocol in accordance with implementations of the present disclosure.
Figure 4:
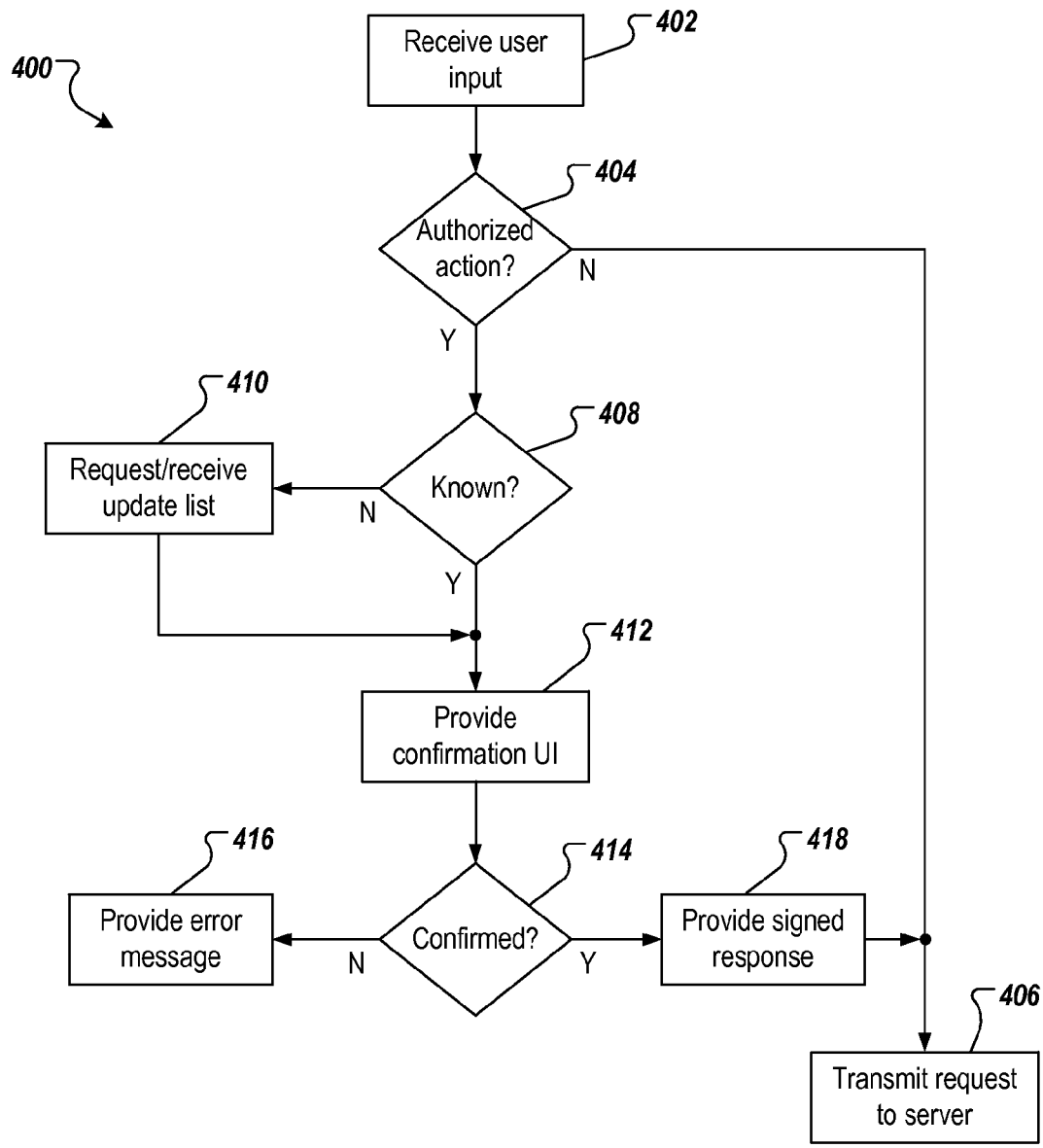
FIG. 4 depicts an example process that can be executed in accordance with implementations of the present disclosure.

FIG. 3 depicts an example protocol 300 in accordance with implementations of the present disclosure. In the example of FIG. 3, a user 302 is interacting with the web application 202 using the web browser 204. The user 302 provides user input 310 to the web browser, e.g., tapping on an interaction element provided in a web page of the web application 202 displayed by the browser 204. In this example, the user input 310 indicates a command for an authorized action to be executed by the web application 202. In response to the user input 310, a request 312 for the authorized action is provided from the web browser 204 to the mobile authenticator application 206. In some examples, the request 312 includes any needed parameters to execute the authorized action, e.g., the server's challenge. In response to the request 312, the mobile authenticator application 206 displays a trusted graphical user interface (GUI) 314 to the user 302. For example, the GUI 314 is displayed as a pop-up GUI over the web browser 204 displayed to the user 302. In some examples, the GUI 314 indicates which authorized action is being requested, and asks the user to authorize or deny the request. For example, the GUI 314 can include an "authorize" interaction element, e.g., button, and can include a "deny" interaction element, e.g., button, either of which the user 302 can tap on to select.

In some implementations, user input 316 is provided to the mobile authenticator application 206. For example, the user input 316 is provided in response to user selection of an interaction element from the GUI 314. In response to the user input 316 indicating that the request is authorized, e.g., the user 302 tapping on the "authorize" interaction element in the GUI 314, the mobile authenticator application 206 computes a response 318 to the server challenge provided in the request 312. In some examples, the response 318 includes a signed response based on a shared secret (dedicated credential) between the mobile authenticator application and the server-side. The mobile authenticator application 206 provides a response 320 back to the web browser 204, which response 320 includes the signed response, and control is passed to the web browser 204. The web browser 204 sends a request 322 to the web application 202, which request 322 includes the signed response provided from the mobile authenticator application 206. In some examples, in response to the request 322 (including the signed response), the web application 202 performs the authorized action 324.

Implementations of the present disclosure can be provided based on a plurality of components. Example components include the mobile authenticator application, which is executed on the mobile computing device and provides the trusted GUI, a server-side module, which is executed on the server, evaluates incoming requests and checks the integrity of the authentication token, and an authentication broker, e.g., a JavaScript library, that is delivered to the web browser and coordinates delegation between components.

In some implementations, the mobile authenticator application is a client-side application that maintains a repository of preconfigured authorized actions, e.g., a list of authorized actions, as described in further detail herein. In some examples, for each authorized action in the list of authorized actions, a human-readable description is provided. In some examples, the human-readable description indicates the authorized action and the impact execution of the authorized action will have. An example human-readable description can be provided as:

The application Mobile Banking application (www.m-.bank.com) wants to execute an action (Login) that needs your authorization. Do you want to login to the Mobile Banking application?

In some examples, in response to receiving a request for execution of an authorized action from the web browser, the mobile authenticator application looks up details of the respective authorized action in its repository, displays the description to the user, e.g., in the trusted GUI, and asks for user consent for the authorized action to be executed, e.g., using the trusted GUI. In some examples, and in response to received user consent, the mobile authenticator application signs the request using a secret that is shared with the web application (shared secret), as described in further detail herein. For example, the mobile authenticator application signs the request with the shared secret. In some examples, the mobile authenticator application passes the signed request to the web browser. In some examples, if the user does not consent to execution of the authorized action, the mobile authenticator application provides a fault message to the web browser.

In some implementations, the server-side module is provided at the server that hosts the web application. In some examples, the server-side module maintains a trust relationship with the mobile authenticator application executed on the client-side. In some implementations, the server-side module provides a challenge/response process to accept incoming requests for authorized actions. In some implementations, the server-side module is provided in the web application.

In some implementations, the authentication broker is provided as a library, e.g., a JavaScript library. In some examples, the authentication broker is a JavaScript file that is included with each web page of the web application, and can be stored in the local storage of the web browser together with a list of authorized actions, and hooks requests for each action. In some examples, the authentication broker provides an interface to the front-end of the web application, e.g., provided through the web browser, to delegate authorized actions to the mobile authenticator application for obtaining user consent. In some examples, upon receiving a signed response from the mobile authenticator application, the signed response is routed to the web application for processing. It can be noted that the authentication broker is itself not security critical. In some examples, the worst impact of an attack against the authentication broker is a denial-of-service that prevents authenticated requests from being routed to the mobile authenticator application.

Implementations of the present disclosure provide an enrollment protocol that enables the web browser and the mobile computing device to interact, as described herein. In some examples, each instance of the mobile authenticator application that the user wants to use is enrolled individually. In the enrollment protocol, the server-side and an instance of the mobile authenticator application initiate a device specific trust context. In some examples, the trust context is provided using a shared secret.

In some implementations, a user sets up an account with the web application. In some examples, after account setup, the web application provides the user with a unique URL pointing back to the application, which URL includes parameters that identify the enrollment protocol. For example, the URL can be provided in a web page that is displayed by the web browser after the user sets up the account with the web application. The user provides the URL to the mobile authenticator application. For example, the user can copy the URL to a clipboard, can initiate execution of the mobile authenticator application, and pastes the URL into a user interface of the mobile authenticator application. In some examples, manual copying and pasting of the URL avoids potential spoofing attempts, e.g., from malware residing on the mobile computing device. In some examples, the mobile authenticator application uses the received URL to directly contact the server-side. In some examples, the domain of the web application is displayed to the user with a request for user confirmation. In some examples, the user confirms by entering credentials, e.g., password, which is used by the mobile authenticator application for authentication. If the initial authentication step terminated successfully, the mobile authenticator application and the web application compute a shared secret, e.g., using the Diffe-Hellman key exchange. In some examples, the shared secret is not only specific to the user, but is also specific to the instance of the mobile authenticator application. In some examples, the mobile authenticator application discards the user credentials. Subsequent application-to-server interactions use the shared secret for authentication. As long as the shared secret is valid, the user will not be required to enter credentials again.

In some implementations, to complete the enrollment protocol, the web application supplies a repository of configured authorized actions, e.g., a list of authorized actions, including parameters and respective action identifiers (actionIDs), as well as a human-readable description of the result, e.g., impact, for each authorized action. In some implementations, the mobile authenticator application is able to maintain several of such shared key/repository records and can thus protect all user accounts for compatible web applications on the mobile computing device. After the enrollment protocol, the mobile authenticator application and the web application are synchronized. In accordance with implementations of the present disclosure, the mobile authenticator application is the primary means to authenticate the user to the web application for execution of authorized actions.

In some implementations, a login protocol is provided to enable the user to login to the web application. In some examples, the login protocol follows the OpenID communication flow. For example, the user accesses the login page of the web application using the web browser. When tapping the login button, for example, control is delegated by the authentication broker (provided on the mobile computing device) to the mobile authenticator application. For example, and as described above with reference to FIG. 3, a request is provided to the mobile authenticator application, the request including the actionID representing the login request and the server challenge. The mobile authenticator application assumes control and asks the user whether the user wants to login to the web application, e.g., using the GUI as discussed above with reference to FIG. 3. As a note, a phishing attack would fail at this point, as the user credentials are not entered into the mobile computing device. In some examples, the login request is signed by the mobile authenticator application with the shared secret, e.g., using hash-based message authentication code (HMAC), and control is transferred back to the web browser. As a result, the signed server challenge is provided back to the web browser and is received by the authentication broker, which uses the data received from the mobile authenticator application to send the resulting, signed login request to the web application. Upon receiving the signed login request, the server verifies, that the request was indeed signed using the shared secret to enable completion of the login process. In some examples, and in response to the user being logged in, the server-side promotes the user session and, thus, the user's session cookie into an authorized state. In some examples, and in response to the user being logged in, an authentication cookie is set in a resulting hypertext transfer protocol (HTTP) response.

In some implementations, a protocol for executing authorized actions is provided. In some examples, the protocol for executing authorized actions parallels the above-described login protocol. For the login protocol, the mobile authenticator application witnesses the user's consent and proves the request's integrity, and its own authentication, by signing the request using the shared secret. The same features are provided for the protocol for executing authorized actions. For example, in the web browser, the user taps an interaction element, e.g., a link, a button, to request execution of an authorized action. The respective request is relayed to the mobile authenticator application, which obtains the user's consent, e.g., using the GUI, signs, and returns the request to the web browser. The authentication broker forwards the signed request to the web application, which verifies the signature and performs the requested authorized action.

In some implementations, and as described above, during enrollment, the server provides a list of allowed authorized actions to the mobile authenticator application. In this manner, when the mobile authenticator application receives a request for an authorized action, the mobile authenticator application can use the provided actionID to find the authorized action in the list, and provide the description of the authorized action in the GUI. In some instances, however, the web application can be updated, since initial enrollment of the mobile authenticator application. Consequently, the mobile authenticator application can receive a request for an authorized action that is not included in the list, e.g., an authorized action that is available since updating of the web browser. In some examples, and in response to the mobile authenticator application determining that the requested authorized action is not included in the list, the mobile authenticator application updates the list, i.e., the local repository. For example, the mobile authenticator application directly retrieves an updated list from the web application. In some examples, this update process can also be triggered in a regular manner or based on push messages. After receiving the updated list from the web server, the mobile authenticator application verifies that the requested authorized action is indeed contained in the updated list. If this is not the case, the mobile authenticator application rejects the action request.

Implementations of the present disclosure further provide example challenge and response formats corresponding to respective interactions. In some examples, a format is provided for a server challenge. For example, for an authorized action, the server provides a challenge tuple. An example challenge tuple includes:

CTupel={AppID, UserID, ActionID, timestamp}

In some examples, the server signs the challenge tuple with the user-specific shared secret, e.g., using HMAC. This enables the mobile authenticator application to verify the authenticity of the challenge. In some examples, AppID is a unique identifier assigned to the web application, and UserID is a unique identifier assigned to the user account with the web application. The AppID and the UserID enable the mobile authenticator application choose the correct authentication context. In some examples, ActionID is an unambiguous identifier assigned to the requested authorized action. In some examples, the timestamp is provided to mitigate potential replay attacks. For example, each challenge can be assigned a dedicated lifespan, e.g., similar to an expiration date of an HTTP cookie.

In some implementations, the resulting, signed challenge consists of the tuple and signature, e.g., in JavaScript Object Notation (JSON) with HMAC signature. An example signed challenge can be provided as:

SChallenge=HMAC(CTuple, sharedsecret)

In some examples, on the server-side, the challenge is bound to the user's session and, thus, to the session identifier assigned to the user.

In some implementations, a client response format is provided. For example, after interacting with the user to capture the user's explicit consent, e.g., receiving user input through the GUI, the mobile authenticator application creates the response by assembling a response tuple. An example response tuple can be provided as:

RTuple={SChallenge, (Parameter1), . . . , (Parameteri)}

In some examples, the response tuple is signed by the mobile authenticator application with the shared secret, e.g., using HMAC. An example signed response can be provided as:

CResponse=HMAC(RTuple, sharedsecret)

The existence and number of the parameters depends on the specifics of the respective authorized action. For example, the login action does not require any parameters, while the transfer of money in a banking application can the amount and the receiving account number as parameters in the signed response. The signed response is provided from the mobile authenticator application to the web browser, which transmits the signed response to the server-side to illicit execution of the respective authorized action.

FIG. 3 depicts an example process 300 that can be executed in accordance with implementations of the present disclosure. In some implementations, the example process 300 can be realized using one or more computer-executable programs (e.g., a browser, a web application, a mobile application) executed using one or more computing devices (e.g., a client-side computing device, a server-side computing device).

User input is received (402). For example, the user can tap on an interaction element displayed in a web page of a web application by a web browser. It is determined whether the user input indicates a request to execute an authorized action (404). For example, an authentication broker determines whether the user input indicates a request to execute an authorized action. If the user input does not indicate a request to execute an authorized action, a request is transmitted to the server (406). For example, the web browser transmits an unsigned HTTP request to the web application that is hosted on the server. If the user input indicates a request to execute an authorized action, it is determined whether the requested authorized action is known (408). For example, if the user input indicates a request to execute an authorized action, control is delegated to the mobile authenticator application, which receives an ActionID, among other data, and determines whether the ActionID is included in the list of authorized actions. If the Action ID is included in the list of authorized actions, the requested authorized action is determined to be known.

If the requested authorized action is not known, e.g., is not included in the list of authorized actions, the mobile authenticator application requests and receives an updated list of authorized action (410), e.g., from the web application. If the requested authorized action is known, a confirmation UI is displayed to the user (412). For example, and as described herein, a trusted GUI is displayed to the user, which includes a description of the requested authorized action, and provides interaction elements for the user to confirm or deny the request.

It is determined whether the requested authorized action is confirmed by the user (414). For example, user input is provided through the trusted GUI, e.g., by the user tapping on an interaction element. If it is determined that the requested authorized action is not confirmed by the user, an error message is provided (416). If it is determined that the requested authorized action is confirmed by the user, a signed response is provided 418, and the request with signed response is transmitted to the server (406). For example, if it is determined that the requested authorized action is confirmed by the user, the mobile authenticator application provides the signed response, e.g., signed using the shared secret, and provides the signed response to the web browser, which transmits the signed response to the server-side to illicit execution of the respective authorized action.

Figure 5:
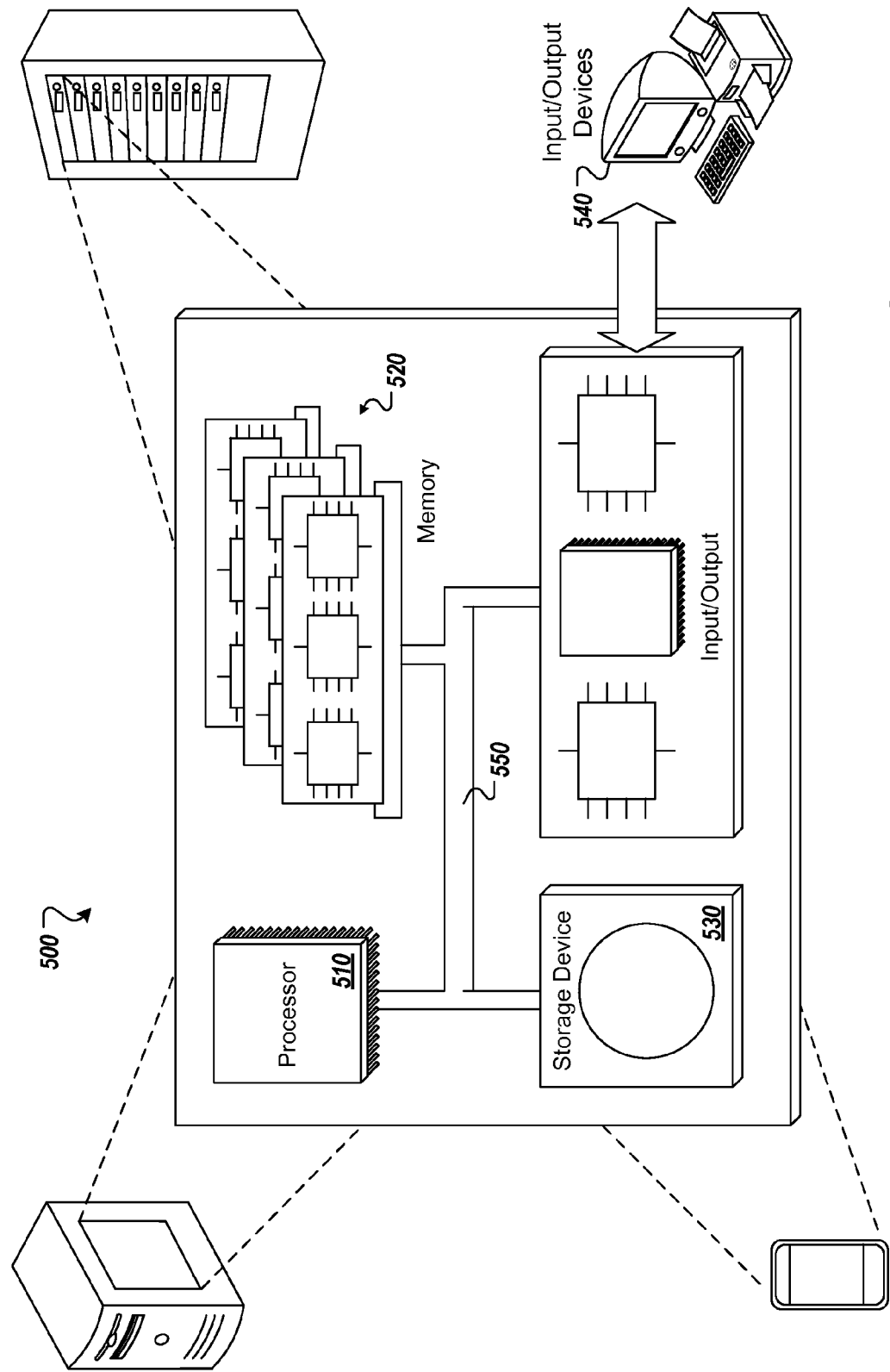
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for user confirmation of actions to be performed by a web application hosted on one or more servers, the method being executed using one or more processors and comprising:
   receiving, by the one or more processors, user input indicating a request directed to the web application, the user input being received through a mobile web browser;
   determining, by the one or more processors, that the user input is requesting execution of an authorized action and in response, providing data associated with the request for processing by a mobile authenticator application that is installed on and executed by a client-side computing device and serves as a trust anchor for a user-side configured to provide a trusted path between a user interface and the web application;
   providing the user interface generated by the mobile authenticator application based on the data; and
   receiving user confirmation of the authorized action through the user interface, and in response:
      providing a signed response by the mobile authenticator application, and
      transmitting the signed response to the one or more servers to initiate execution of the authorized action.

2. The method of claim 1, wherein the mobile authenticator application provides the signed response based on a shared secret.

3. The method of claim 1, wherein the mobile authenticator application provides the signed response to the mobile web browser, and the mobile web browser transmits the signed response to the one or more servers.

4. The method of claim 1, wherein the user interface displays a description of the authorized action.

5. The method of claim 4, further comprising:
   providing an action identifier associated with the authorized action to the mobile authenticator application; and
   retrieving, by the mobile authenticator application, the description from a repository of authorized actions based on the action identifier.

6. The method of claim 1, wherein an authentication broker determines that the user input is requesting execution of an authorized action, and provides data associated with the request for processing by the mobile authenticator application.

7. The method of claim 1, further comprising, prior to receiving user input indicating a request directed to the web application, providing a shared secret between the mobile authenticator application and the web application.

8. The method of claim 7, wherein the shared secret is provided based on credentials of the user with the web application.

9. A non-transitory computer-readable storage medium coupled to one or more processors and having instructions stored thereon which, when executed by the one or more processors, cause the one or more processors to perform operations for user confirmation of actions to be performed by a web application hosted on one or more servers, the operations comprising:
- receiving user input indicating a request directed to the web application, the user input being received through a mobile web browser;
- determining that the user input is requesting execution of an authorized action, and in response, providing data associated with the request for processing by a mobile authenticator application that is installed on and executed by a client-side computing device and serves as a trust anchor for a user-side configured to provide a trusted path between a user interface and the web application;
- providing the user interface generated by the mobile authenticator application based on the data; and
- receiving user confirmation of the authorized action through the user interface, and in response:
  - providing a signed response by the mobile authenticator application, and
  - transmitting the signed response to the one or more servers to initiate execution of the authorized action.

10. The computer-readable storage medium of claim 9, wherein the mobile authenticator application provides the signed response based on a shared secret.

11. The computer-readable storage medium of claim 9, wherein the mobile authenticator application provides the signed response to the mobile web browser, and the mobile web browser transmits the signed response to the one or more servers.

12. The computer-readable storage medium of claim 9, wherein the user interface displays a description of the authorized action.

13. The computer-readable storage medium of claim 12, wherein operations further comprise:
- providing an action identifier associated with the authorized action to the mobile authenticator application; and
- retrieving, by the mobile authenticator application, the description from a repository of authorized actions based on the action identifier.

14. The computer-readable storage medium of claim 9, wherein an authentication broker determines that the user input is requesting execution of an authorized action, and provides data associated with the request for processing by the mobile authenticator application.

15. The computer-readable storage medium of claim 9, wherein operations further comprise, prior to receiving user input indicating a request directed to the web application, providing a shared secret between the mobile authenticator application and the web application.

16. The computer-readable storage medium of claim 15, wherein the shared secret is provided based on credentials of the user with the web application.

17. A system, comprising:
- a client-side computing device; and
- a non-transitory computer-readable storage device coupled to the client-side computing device and having instructions stored thereon which, when executed by the client-side computing device, cause the client-side computing device to perform operations for user confirmation of actions to be performed by a web application hosted on one or more servers, the operations comprising:
  - receiving user input indicating a request directed to the web application, the user input being received through a mobile web browser;
  - determining that the user input is requesting execution of an authorized action, and in response, providing data associated with the request for processing by a mobile authenticator application that is installed on and executed by a client-side computing device and serves as a trust anchor for a user-side configured to provide a trusted path between a user interface and the web application;
  - providing the user interface generated by the mobile authenticator application based on the data; and
  - receiving user confirmation of the authorized action through the user interface, and in response:
    - providing a signed response by the mobile authenticator application, and
    - transmitting the signed response to the one or more servers to initiate execution of the authorized action.

18. The system of claim 17, wherein the mobile authenticator application provides the signed response based on a shared secret.

19. The system of claim 17, wherein the mobile authenticator application provides the signed response to the mobile web browser, and the mobile web browser transmits the signed response to the one or more servers.

20. The system of claim 17, wherein the user interface displays a description of the authorized action.

* * * * *